United States Patent
Zazzu et al.

(10) Patent No.: US 6,616,043 B2
(45) Date of Patent: Sep. 9, 2003

(54) MULTI SENSOR INFORMATION READER

(76) Inventors: Victor Zazzu, 22 Monroe Ave., Belle Mead, NJ (US) 08502; Wenyu Han, 5C Marten Rd., Princeton, NJ (US) 08540

( * ) Notice: Subject to any disclaimer, the term of this patent is extended or adjusted under 35 U.S.C. 154(b) by 0 days.

(21) Appl. No.: 09/843,224

(22) Filed: Apr. 26, 2001

(65) Prior Publication Data

US 2002/0043562 A1 Apr. 18, 2002

Related U.S. Application Data

(63) Continuation-in-part of application No. 09/056,134, filed on Apr. 7, 1998, now abandoned.
(51) Int. Cl.$^7$ ................................................ G06K 7/10
(52) U.S. Cl. .............................. 235/462.01; 235/462.34
(58) Field of Search ................................ 235/454, 382, 235/457, 462.01, 462.34, 437, 438, 487

(56) References Cited

U.S. PATENT DOCUMENTS

| | | | | |
|---|---|---|---|---|
| 3,905,705 A | * | 9/1975 | Petrohilos | ................... 356/160 |
| 4,041,279 A | * | 8/1977 | Foote | ................... 235/462.01 |
| 4,761,543 A | * | 8/1988 | Hayden | ....................... 235/457 |
| 5,139,339 A | * | 8/1992 | Courtney et al. | ........... 356/446 |
| 5,306,899 A | * | 4/1994 | Marom et al. | .............. 235/382 |
| 5,570,191 A | * | 10/1996 | Uesugi et al. | .............. 356/402 |

* cited by examiner

*Primary Examiner*—Daniel St. Cyr

(57) ABSTRACT

An information reader formed within a unitary enclosure for sensing whether information on a surface to be read is valid includes a plurality of different sensors for sensing the presence of different types of information on the surface being read. Each sensor is programmed to sense whether certain criteria pertaining to that sensor are met. In addition, the outputs of selected sensors are compared to ascertain whether the outputs of the selected sensors have a preset relationship indicative of a valid condition. In one embodiment the information reader includes a hologram sensor, a surface quality sensor, a bar code reader and a magnetic stripe read/write sensor.

47 Claims, 10 Drawing Sheets

MULTI SENSOR INFORMATION READER

CROSS REFERENCES TO RELATED APPLICATIONS

This application is a continuation-in-part of U.S. patent application Ser. No. 09/056,134 filed Apr. 7, 1998 now abandoned entitled Multi Sensor Information Reader.

BACKGROUND OF THE INVENTION

This invention relates to a multi sensor information reader for concurrently detecting a selected number of different codes (e.g., bar codes, magnetic codes and/or holographic hidden codes) formed on a surface, and also certain characteristics of the surface on which the codes are formed.

The surfaces to be read (sensed) may be, for example, the surfaces of cards. The cards to be read by information readers embodying the invention may be, for example, commonly used plastic cards which may be used, for example, to draw money from a bank teller type machine. Because of their value, there are counterfeiters who make "false" cards which attempt to imitate "true" or "valid" cards in order to withdraw money illegally from these bank teller type machines. To make the "true" cards secure against counterfeiting, the cards are made to include, for example, a combination of two, or more, of the following features: a bar code, a magnetic stripe, a hologram, and a surface having certain predetermined characteristics.

It is therefore an object of this invention to provide an information reader which can determine whether a card being read contains certain predetermined information. If the card contains the predetermined information the data reader determines that the card is valid and will transmit that information to a host computer, which will then cause appropriate action responsive to the card command. If the card is found not to be valid, the data reader will reject the card and will also perform certain predetermined functions such as informing the host computer that there was an attempt to breach the security of the system.

SUMMARY OF THE INVENTION

A reader embodying the invention includes a number of sensors for sensing (reading) information contained on a card, or any surface, to be read. The information derived from each one of the sensors may be used to determine if the card, and/or the information contained thereon, is valid. If the reader recognizes the information read from the card as being valid, the reader will transmit the card information and any corresponding command to a host computer. If the reader determines that the information read from the card does not contain valid information, the reader will reject the card and inform the host computer of an attempt to breach the security of the system.

In a multi-sensor system embodying the invention, each sensor is programmed to sense the presence of a certain (different) condition (or information) on a card (or surface) being read. If the condition to be recognized by a sensor is not present, the sensor produces a signal indicating that the required condition (or information) is not present and the system will treat the card as being invalid. In addition, the outputs of selected sensors are compared with each other to determine whether certain preset relationships exist between, or among, their output signals. The preset relationships must be present for the card to be considered valid by the system.

In one embodiment of the invention a multi sensor reader includes a bar code reading means for sensing bar code data contained on a card in combination with a magnetic data reading means for sensing magnetic data contained on said card.

In another embodiment of the invention a multi sensor reader includes a bar code reading means for sensing bar code data contained on a card, a magnetic data reading means for sensing magnetic data contained on the card and optical sensing means for sensing holographic information contained on the card.

In a still farther embodiment of the invention, a multi sensor reader includes bar code reading means for sensing bar code data contained on a card in combination with a magnetic data reading means for sensing magnetic data contained on the card, a first optical sensing means for sensing holographic information contained on the card, and a second optical sensing means for sensing certain characteristics of the card surface.

In still another embodiment of the invention, a multi sensor reader includes a central processing unit (CPU) coupled to the bar code reading means, to the magnetic data reading means and to the first and second optical sensing means for processing the data sensed by these means.

In a still further embodiment of the invention all the sensors are contained within the same enclosure.

In still another embodiment of the invention, a laser light source is used to illuminate a card (or surface) to produce light reflections to be sensed by first and second optical sensing means for comparing the signals received by the optical sensing means.

In a still further embodiment of the invention, the first and second optical means are uniquely assembled and include a unique aperture and slit assembly.

BRIEF DESCRIPTION OF THE DRAWING

In the accompanying figures, like reference characters denote like components.

DETAILED DESCRIPTION OF THE INVENTION

Figure 1:
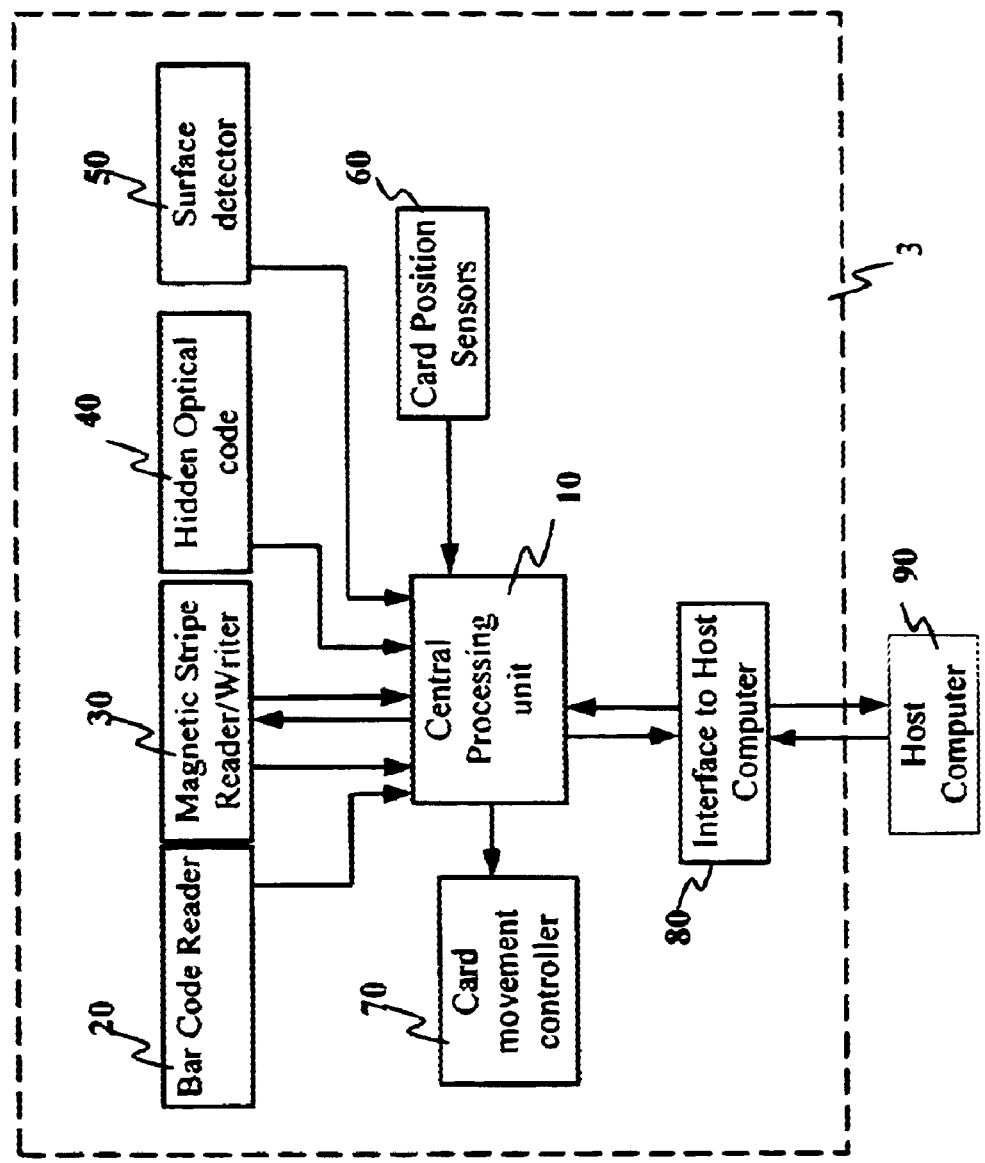
FIG. 1 is a block diagram of an electronic system for a multi sensor reader embodying the invention.

Referring to FIG. 1 there is shown a block diagram of part of the electronic system of a multi-sensor reader embodying the invention. The electronic system embodying the invention is contained within an enclosure 3 which includes several electronic subsystems whose outputs are coupled to a central processing unit (CPU) 10. The central processing unit 10 is coupled to a bar code reader 20, a magnetic stripe reader/writer 30, a hidden optical code (hologram) sensor 40, a surface detector 50, card position sensor circuit 60, a card movement controller 70, and interface circuitry 80. The interface 80 functions to couple the CPU 10 to a host computer 90. A predetermined number of position sensors (PSi) (see FIG. 2) are coupled to card position sensor circuit 60 which is coupled to the CPU 10. In response to received position signals, CPU 10 detects the position of a card as it travels through the reader and then controls the motion (position) of the card (mounted, for example, on a motorized carriage base) and various functions of the reader as the card passes through the reader.

The electronic and mechanical assemblies of an information reader embodying the invention may be formed within an enclosure 3, containing a motorized carriage base,17, (shown as a dashed line in FIG. 2) of the type used in magnetic card readers. An example of a suitable motorized carriage base is found in a magnetic stripe reader machine made by Omron Ltd. of Japan. As outlined in FIG. 2, the bar code reader 20, the magnetic stripe reader/writer 30, the hologram detector 40 and the surface detector 50 are all mounted within the same enclosure 3 and arranged to read (sense) the contents and characteristics of a card passing within the sensing range of sensing means 20, 30, 40 and 50.

The data reader shown in the Figures includes three optical sensing means (20, 40 and 50) mounted about a motorized carriage base, in addition to a magnetic stripe read/write means 30. Optical sensing means 20 is a bar code scanner which includes a light emitting element 21, for illuminating a bar code on the card, and a light sensing element (not expressly shown) for sensing reflected light. The light emitting element 21 may be a light emitting diode (LED), operating in the visible, red or infrared region which is provided to illuminate bar codes present on any card, or surface, to be read by bar code scanner 20. The light sensing element may be any one of a number of known charge coupled devices (CCDs) or any other suitable detector.

A laser light source 31 is provided to project a light beam onto the surface of a card to illuminate the surface of the card and any hologram contained on the surface of the card. Light source 31 may be a solid state laser which may be operated in the visible spectra at 670 nanometers (although IR operation is also feasible). Light sources 21 and 31 are arranged so as not to interfere with each other. In the embodiment shown in FIGS. 2 and 3, the bar code scanner 20 and light source 21 are positioned below the carriage base (and the path of travel of the card) so as to illuminate a bar code formed on the underside of the card and read the signals reflected therefrom. The laser light source 31 is positioned to illuminate the top surface of the card containing a hologram and optical sensors S1 and S2 are positioned to sense light reflected from the top surface. Light reflected from the top surface of a card (or any surface) is sensed by first and second optical photodetectors S1 and S2. S1 is positioned to detect laser light reflected from a hologram contained on the top surface of a card to be read and is coupled to hologram sensor circuit 40. S2 is also positioned to sense light reflected from the top surface of a card and is coupled to surface detector circuit 50. The three optical sensing means (20, 40 and 50), located within the information reader enclosure 3, together with light sources 21 and 31 are arranged to reduce possible interference between the light sources and among the various subsystems contained within the reader enclosure.

The information reader includes, as does known magnetic card readers, mechanical and electrical components to enable the reading (and writing) of a magnetic stripe located in a predetermined location on a card to be read. Thus the reader includes a magnetic sensor to sense the magnetic information present on the card. The decoding of the magnetic information and the control of the card motion and position is achieved under the control of the central processing unit 10.

Figure 2:
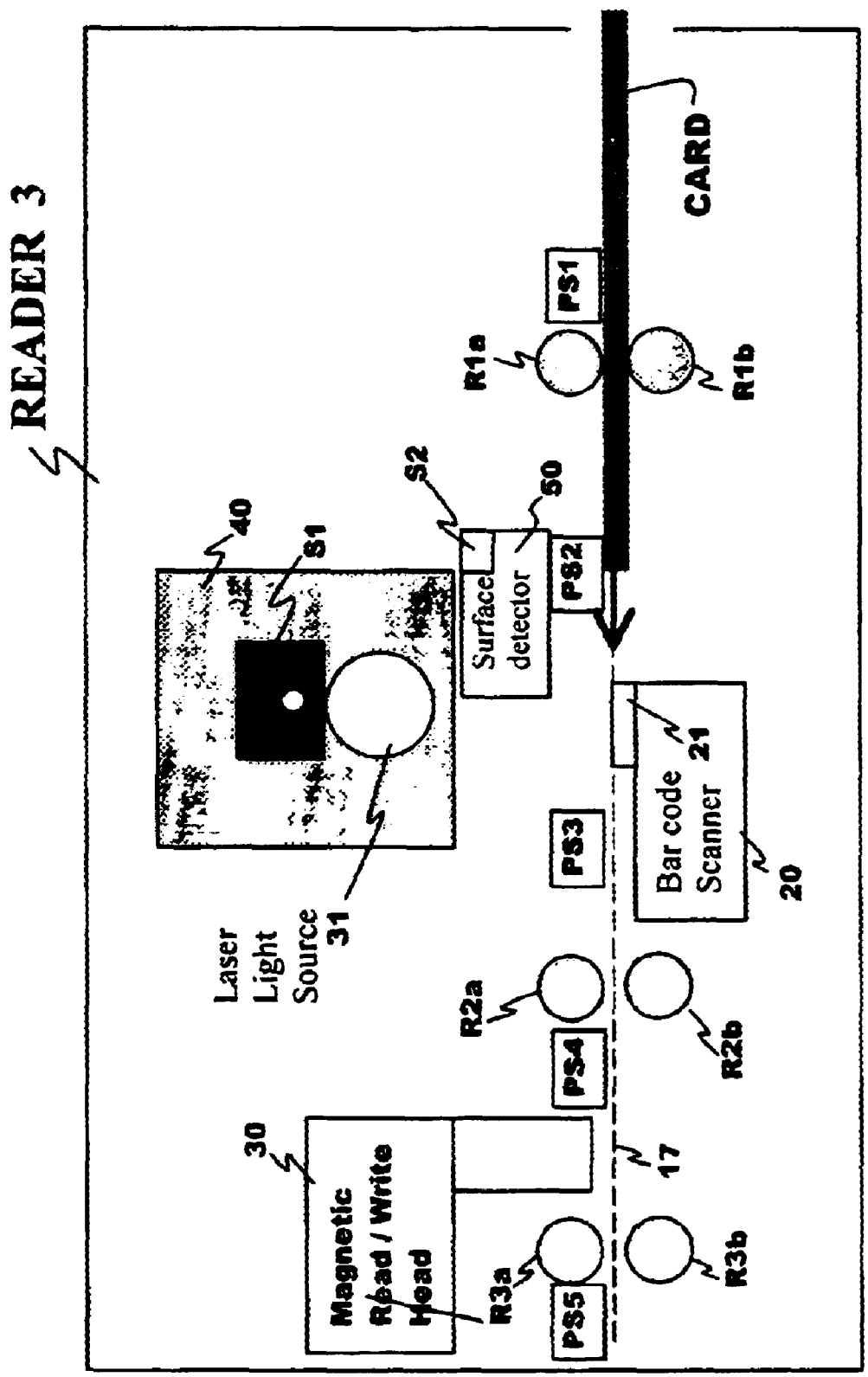
FIG. 2 is an idealized cross sectional view of a portion of a multi sensor reader embodying the invention.

FIG. 2 is a symbolic (not to scale) cross sectional view of the multi-sensor reader showing the path of travel of a card whose contents are to be read and various sensors and mechanisms along the path. Five position sensors (PS1 through PS5) are shown disposed along the length of the motorized carriage to sense the insertion of a card into the reader and its position along the carriage in order to control the movement of the card along its travel path. The position sensors also control the initiation of various read/sense cycles. Pairs of card transport rollers (R1a, R1b; R2a, R2b; R3a, R3b) are used to ensure the proper movement of the card along its travel path.

In brief, in FIG. 2, the following illuminating and sensing systems are shown disposed along the travel path of the card:
 1. A laser light source 31 for projecting a beam of light onto a card passing along the travel path, where the laser light source 31 functions to provide the illumination for detecting any hologram contained on the card and certain characteristics of the card surface;
 2. A hologram detector 40 including a sensor S1 to sense the hologram information contained on (and tne light reflected from) a top surface of a card passing along the travel path;
 3. A surface detector 50 including a sensor S2 for sensing light reflected from the top surface of a card passing along the travel path;
 4. A bar code reader 20 including a light source 21 for illuminating a card and light sensing means (not shown) for reading bar code information contained on the underside of the card; and
 5. A magnetic read/write head and detector arrangement 30 for sensing (reading) magnetic information contained on the card and for writing magnetic information onto the card.

As shown in FIG. 2, the card enters the reader on the right of the drawing, closest to position sensor PS1. When the card passes over PS1, PS1 senses the presence of a card and sends a signal to the CPU 10 (See FIG. 1) which is then informed of the presence of the card at the PS1 sensor. When that occurs, the CPU 10 will initialize the motor transport mechanism to further the forward motion of the card into the reader. The motion of the card through the reader is controlled by CPU 10 in response to various signals from the position sensors. By way of example, it may be assumed that the transport speed is typically set at 100–200 mm/sec, although lower and/or higher transport speeds may be used.

As the card moves through the reader and reaches position sensor PS2, the sensor PS2 detects the presence of the card and signals the CPU 10 to begin a read cycle. That is, almost immediately after the card has activated the PS2 position sensor, the CPU 10 activates the laser light source 31 to project a laser beam onto the top surface of the card and provide light signals for S1 and S2 and detectors 40 and 50, and also activates the LED light source 21 associated with bar code reader 20 in order to illuminate and project light onto the bar code located on the underside of the card passing along the travel path. Concurrently, the CPU 10 activates the optical sensor circuits 20, 40 and 50, if not already fully powered. The magnetic sensor circuit 30 may also be activated at this time, or it may be activated subsequent thereto.

The hologram detector 40 and the surface detector 50 sense the presence of a reflected light signal from the card on which the laser light source is projected. From the reflected light signal, holographic information contained within the card can be read, and certain surface characteristics can be sensed. As detailed below, signals from sensor S2 fed to surface characteristic detector 50 enable detector 50 to immediately sense if the surface has an improper reflectivity level (indicative of a counterfeit card) and cause the card to be immediately rejected. Concurrently, signals obtained from sensor S1 can also be analyzed to determine whether the code being read has the correct form and format. Signals obtained from S1 and S2 are also compared to determine whether the signals have a correct, preset, phase relationship relative to each other. All these measurements and comparisons are used to assess the validity of a card being read and to reject counterfeit cards. Concurrently, bar code reader 20, which may be a conventional bar code reader, will detect the presence of bar code information and subsequently decode that information.

After the back end of a card passes position sensor PS3, a signal is sent to CPU 10 to cause it to turn off light sources 21 and 31 and to place sensors 20, 40 and 50 in a passive mode. [Alternatively, if the card is traveling in the opposite direction (i.e., from left to right in FIG. 2), PS3 would send a signal to the CPU to cause the activation of light sources 21 and 31 and the powering up of detectors 20, 40 and 50.]

As the card approaches position sensor PS4, the magnetic head is activated (if not previously activated) and the data on the magnetic stripe can be decoded. As the card passes position sensor PS5, all of the information on the card has been read. The CPU 10 then performs calculations on the holographic and/or bar code data which has been read from the card to determine if the data that was read from the card is valid. If the information on the card is determined to be valid, then that information is passed on to the host computer 90 and the card is ejected out of the rear (or the front) of the reader. If the data read from the card is deemed to be invalid, then that information is also transmitted to the host computer 90 and the card is then rejected (either out of the front, or the rear, of the reader).

Figure 3:
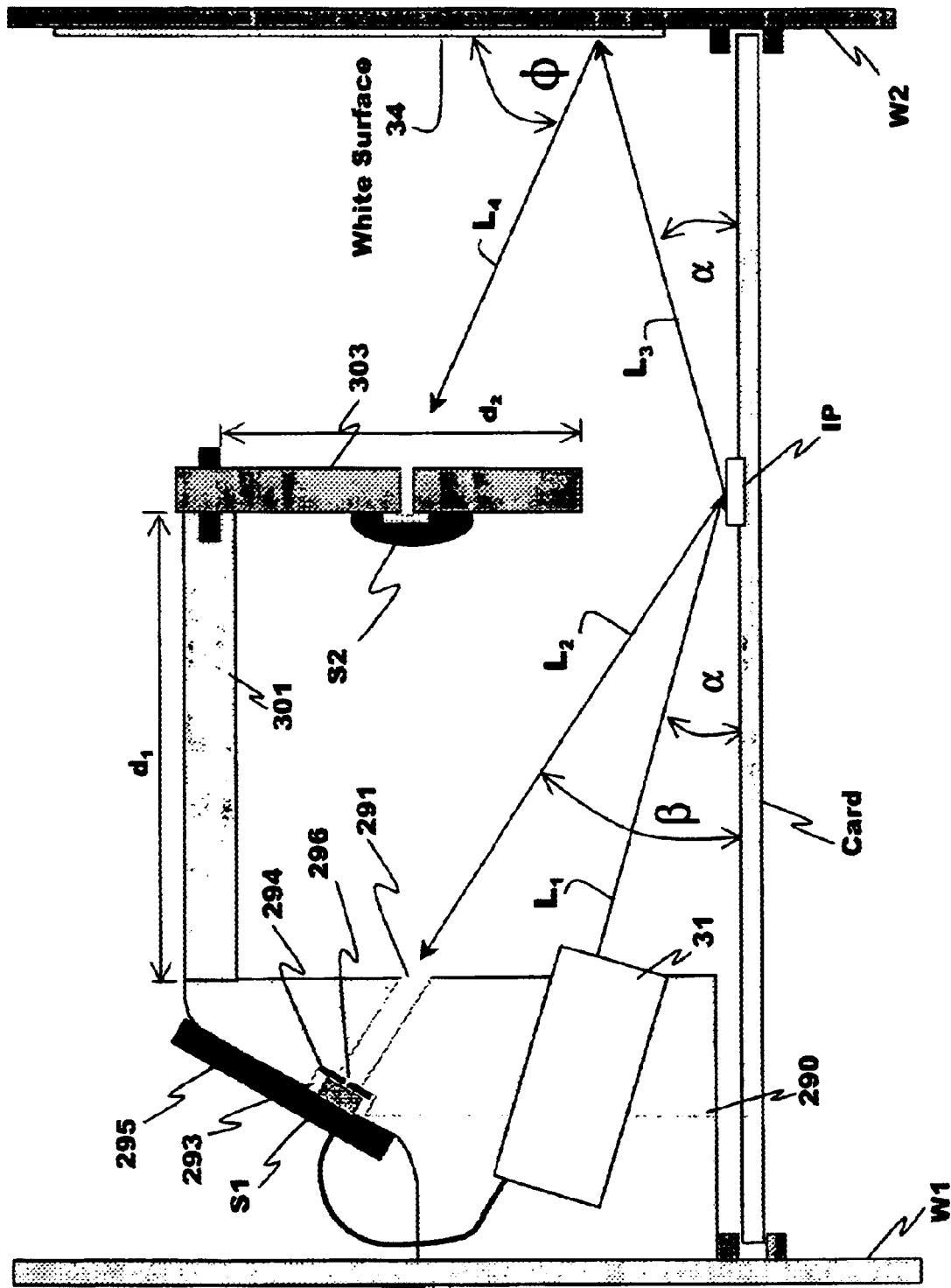
FIG. 3 is a cross sectional diagram of a portion of an assembly of a hologram detector and a surface characteristic sensor, in accordance with the invention.

Some significant features of the reader embodying the invention will now be further detailed. In FIG. 3, as light source 31 illuminates the card, along the axis where the hologram is placed, the illuminated holographic optical code will reflect a portion of the laser light back to optical sensor S1 and form an image at the point where the hologram optical sensor S1 is located. By way of example, for a "valid" card, the analog signal produced by S1 could have a waveform of the type shown in waveform A of FIG. 4. Typically, the amount of energy reflected from the hologram received at the sensor S1 is less than 5% of the total output power of the laser. The remainder (approximately 95%) of the laser light incident on the illumination point (IP) is reflected away from the light source toward the back wall 34. The surface sensor S2 is used to detect the light that is reflected from the card, away from the light source, and which bounces off the back wall 34. The light which is reflected away from the light source 31 is identified in FIG. 3 as a light beam L3. L3 is projected relative to the horizontal at an angle alpha ($\alpha$) onto the "opposite" side wall W2. The "opposite" or back wall 34 is made to be reflective (e.g., a white surface) so that the light L3 incident thereon will be reflected back as "scattered" light L4; some of which (light L4) is sensed by sensor S2. For example, if the surface of the card is made to be essentially mirror-like, then a large portion (L3) of the incident laser light (L1) is reflected off the card's surface and will be projected onto the back wall 34 of the reader, and from there the light (L4) will be reflected back to the surface sensor S2, as shown in FIG. 3. [Note that sensor S2 could be located on back wall 34. However locating S2 on a member 303, as shown in FIG. 3, enables the more precise location of S2 in a plane which intersects S1 and the light source 31, as detailed below.]

FIG. 3 shows two opposite side walls of the information reader identified as W1 and W2 between which a card is designed to pass and the mechanical assembly (290, 301, 303) to mount detectors S1 and S2 and light source 31. A holding block 290 is mounted along side wall W1. Block 290 includes means for mounting light source 31 and means for optically projecting a laser light beam L1 from source 31 at an angle alpha ($\alpha$) relative to a horizontal plane and means for focusing the light beam W1 onto an illumination point (IP) along the card travel path. The block 290 also includes means for mounting sensor S1. Sensor S1 is mounted in a recess 293 formed on the upper surface (portion 298 in FIG. 6) of block 290. A threaded through-hole 291 is formed, within the area of recessed region 293, through the upper surface 298 of block 290 such that light L2 reflected from the illumination point IP can pass through the hole and via an aperture 294 onto sensor S1. Light reflected back at an angle beta ($\beta$) passes through an aperture/slit arrangement 294 (detailed below), whereby light L2 reflected back from the illumination point, IP, at an angle Beta, impinges on, and is detected by, sensor S1. The sensor S1 mounting assembly may include a printed circuit board 295 for providing needed circuitry and connections for sensor S1 and light source 31 and to secure sensor S1 and aperture assembly 294 within the recess 293. The light sensed by sensor S1 produces a signal which is fed to detector circuit 40 and then to CPU 10 (see FIGS. 1 and 2) to ascertain whether the hologram information on a card (or like surface) being read is valid.

Referring to FIG. 3, note that a horizontal arm 301 extends in a horizontal direction away from the top of block 290 for a distance d1. A vertical arm 303 descends from the end of arm 301 extending vertically downward for a distance d2. The sensor S2 is located along the vertically extending arm 303. The distance d1 is selected such that vertical arm 303, if extended downward, would be, generally, in line with the illumination point, IP. Vertical arm 303 functions to hold sensor S2 in a desired position, relative to S1 and light source 31, and also functions as a shield, to block any scattered light L4 from being reflected back to, and sensed by, sensor S1. The light sensed by sensor S2 causes S2 to produce a signal corresponding thereto which is then fed to detector 50. As detailed below, sensor S2 is used to sense the amount of light reflected from the side wall 34 and the response of the reflected light as a function of time.

At the time ($t_0$) when the card just enters the reader and the laser first illuminates the front edge of the card to be read, the hologram sensor S1 and the surface detector S2 measure the reflected optical energy. S1 and S2 are designed to sense different aspects of the reflected energy. The hologram sensor S1 and the surface detector S2 must produce the appropriate signal output (e.g, waveforms A and D in FIG. 4) for the card to pass some of the tests needed to establish its validity.

Figure 4:
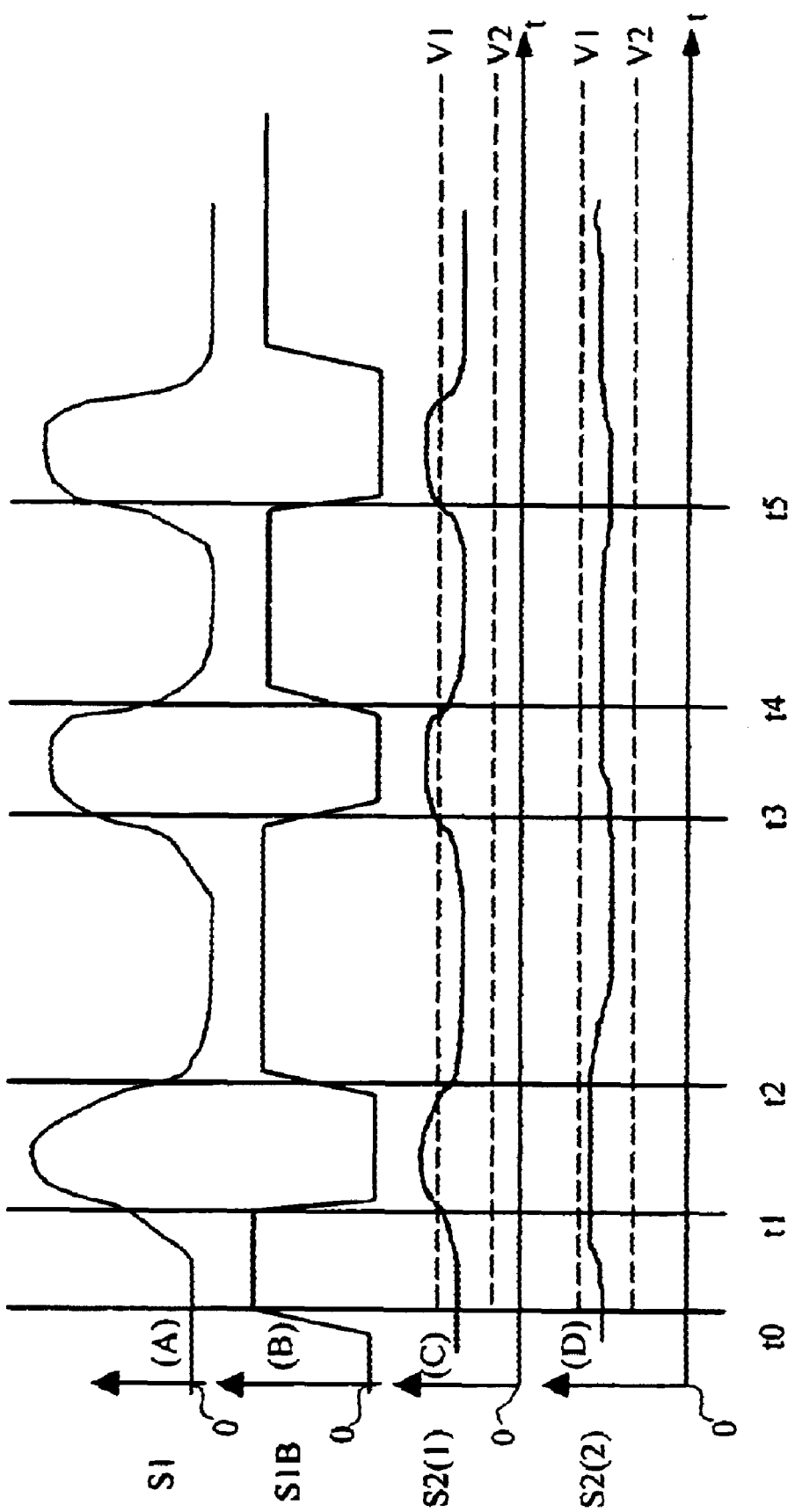
FIG. 4 is a diagram of waveforms illustrating various signal conditions of a hologram sensor and a surface characteristic sensor in systems embodying the invention.
Figure 5:
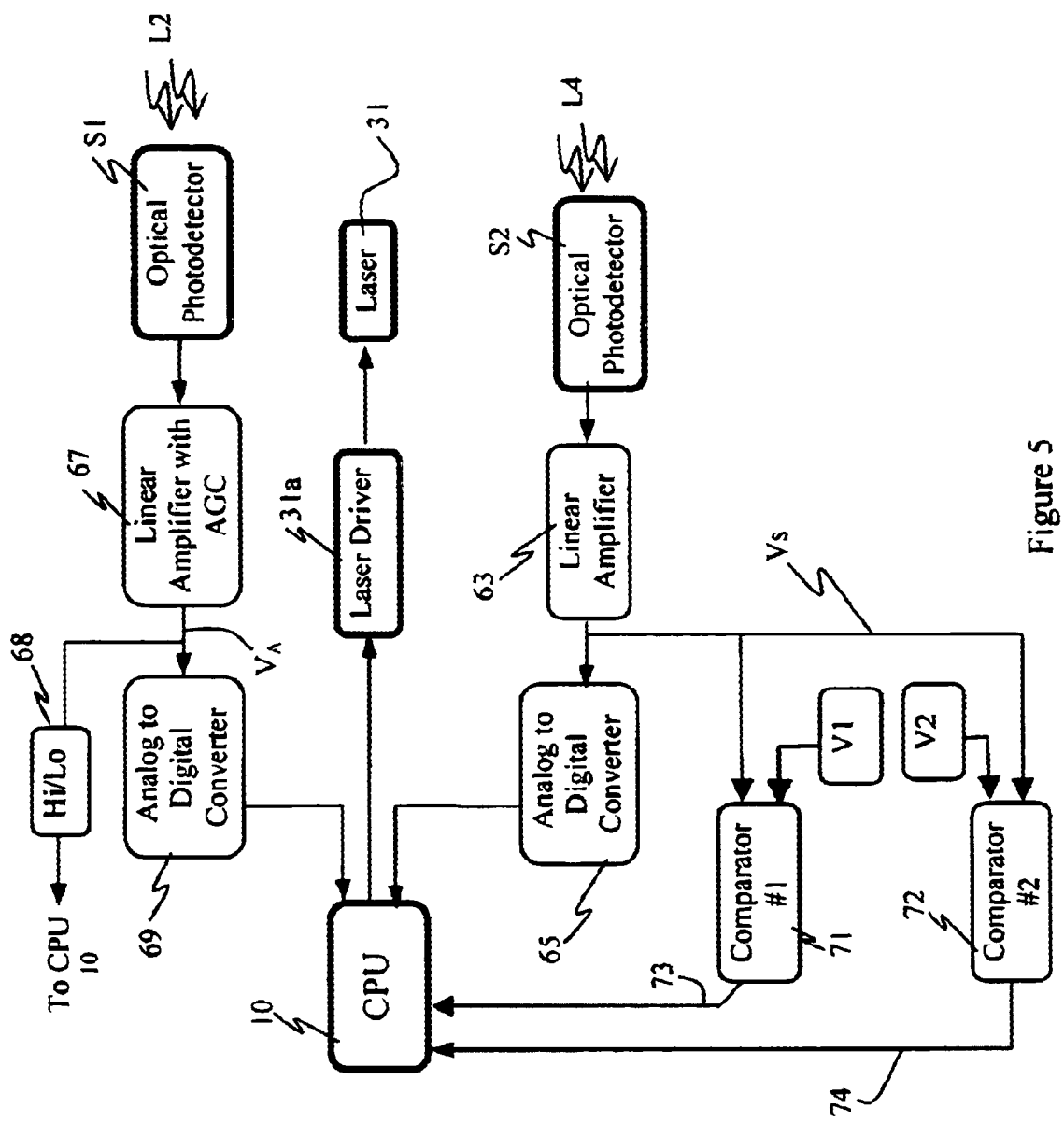
FIG. 5 is a block diagram of circuitry for use with a hologram sensor and with a surface characteristic detection sensor embodying the invention.

It is important to sense the surface quality of the card passing through the reader and to do so quickly. A circuit arrangement for doing so is shown in FIG. 5. The amount of light (L4) reflected from a surface is sensed by sensor S2 and is fed to a linear amplifier 63 where it is converted into a voltage level, Vs. Assume that valid cards to be read have a mirror-like quality. Then, for such a surface, the reflectivity of the card/surface produces a voltage level (Vs) which should lie within a predetermined range, identified as V1 to V2 in waveforms C and D of FIG. 4. Note that waveform D in FIG. 4 depicts the output of sensor S2 when a card with a mirror-like surface is being read. The voltage level Vs is then supplied to first and second comparators; the first comparator 71 is also supplied with a first reference voltage V1 and the second comparator 72 is supplied with a second reference voltage V2. So long as the signal Vs lies in a range between V1 and V2, it is within the acceptable preset range of operation. However, if the signal Vs goes outside the range defined by V1 and V2, an error signal is supplied to CPU 10 indicating that the surface being read does not have the predetermined reflective quality.

The significance of sensing the voltage level produced by sensor S2 and detector 50 is that the amount of light L4 reflected from the region 34 on back wall W2 is a function of the amount of light (L3) reflected from the surface of the card. If the illuminated card surface has a mirror-like surface (akin to that of a hologram), the light reflected onto S2 will be sufficient to produce a voltage which will lie within a predetermined range (e.g., 70–90 percent of a preset voltage). If the card's surface is not formed by a process for producing the anticipated holograms, then the light reflected at S2 will be different than the amount obtained from a mirror like surface. The voltage obtained from S2 will then be outside the anticipated range and an invalidity indication will be produced.

Thus, the system of the invention includes circuitry (see FIG. 5) to sense the "average" or range of the dc level of the signals received by optical sensor S2 as shown for waveform C and D in FIG. 4. The DC level of the light signal sensed by S2 may be detected very quickly; even at time $t_0$. That is, as soon as the card (or any other surface) comes within the range of the optical sensors S1 and S2, the light reflected from the card (or surface) is very quickly sensed. In FIG. 5, the output of S2 is coupled to a window comparator for quickly detecting if the surface reflecting the light beam (L1) has the correct characteristics. However, other suitable detectors or comparators could be used. If the initial DC level is not in a predetermined range (V1 to V2), or whenever the output of S2 exceeds V1 in the positive direction or V2 in the negative direction, the output (73,74) of the window comparator, which is fed to the CPU 10, will indicate that the surface of the card does not have the appropriate surface characteristics. By way of example, a mirror like surface when illuminated will produce a relatively large DC value, while a black (dark) surface, when illuminated will produce a relatively low DC level. Thus sensor S2 and its associated circuitry is used to detect whether the signals reflected from a surface are within preset limits. If the signals are not within the preset limits a signal is generated indicating an invalid condition.

The system also includes circuitry (linear amplifier 67 and HI/LO circuit 68) responsive to the state of the output of sensor S1. Assume that valid cards to be read are formed such that, when read, the output of sensor S1 will always produce a low level prior to the sensing of a hologram. Then, for example, if between times $t_0$ and $t_1$ the analog output signal (waveform A) is high (opposite to the condition shown), the output of linear amplifier 67 will produce a high signal to state detector 68 which will sense the presence of a high (instead of a low) and circuit 68 will then feed CPU 10 a signal indicating an invalid condition.

The block diagram of FIG. 5 also shows circuitry used to compare the output signals of sensors S1 and S2. In FIG. 5, CPU 10 is coupled to a laser driver 31a which controls the turn on and turn off of the laser light source 31. The reflected light "L2" is sensed by S1 whose output is coupled to a linear amplifier 67, having automatic gain control (AGC), whose output is coupled to an analog-to-digital converter (ADC) 69. The output of ADC 69 is fed back to the CPU 10. The reflected light "L4" is sensed by S2 whose output is coupled to the input of a linear amplifier 63 whose output is fed to an ADC 65 whose output is then fed back to CPU 10. CPU 10 processes the signals received from sensors S1 and S2 and compares them. CPU 10 is programmed to recognize whether each one of the signals received from S1 and S2 meets certain requirements and whether the S1 and S2 signals bear a correct phase relationship with respect to each other. As noted above, for some card surface conditions, the signals received from S1 and S2 can not be in-phase relation relative to each other. Hence any time the signals from S1 and S2 are in-phase (even if the S2 output is within the V1–V2 range), the system would determine that the card giving such a result is invalid or false. Hence, in systems embodying the invention, the waveshape produced via S2 is compared with that produced via S1. For an assumed mirror-like card surface, if the waveshape of the signal derived from the card surface by sensor S2 is coherent (in-time phase relationship) with the light energy derived from the hologram sensor S1, as shown in waveform C of FIG. 4 when compared to waveform A, then the card is counterfeit and should be rejected. If the waveshape of the signal derived from sensor S2 bears no time-phase relationship to that of sensor S1, as shown in waveform D off FIG. 4 when compared to waveform A, then the card has passed a test (but not the final test) for validity. This is so because the light reflected from the white reflective surface 34 should have the characteristics of a broad mirror like dispersion of light.

Alternatively, the cards can be designed such that a valid card is one for which the signals produced by S1 and S2 are in phase with each other and the system would then be programmed to recognize such a condition.

Thus, in readers embodying the invention, the waveforms produced by sensors S1 and S2 are also compared to each other to determine their phase relationships. For example, the analog signals produced by S1 in response to a certain holographic code may have the form shown in waveform A of FIG. 4. The signal is then digitized and inverted as shown in waveform B of FIG. 4. The signals received from S1 (either in their analog form or digitized form) are compared to the signals received from sensor S2. Assume that it is predetermined that when the analog signals produce by S1 and S2 are in phase, the sensed card is counterfeit. Then, a card producing the analog signals (waveform A) by S1 and the in-phase analog signals produced by S2 in waveform C, would be invalid. The outputs from comparator circuits (e.g., ADC 65 and 69 supplied to CPU 10 as shown in FIG. 5) would indicate that the code on the card or surface being read is counterfeit. On the other hand, if a card produces the signals corresponding to waveform A and waveform D of FIG. 4, the comparison of waveforms A and D will indicate the card to be valid, barring any other problem.

Figures 6, 6A:
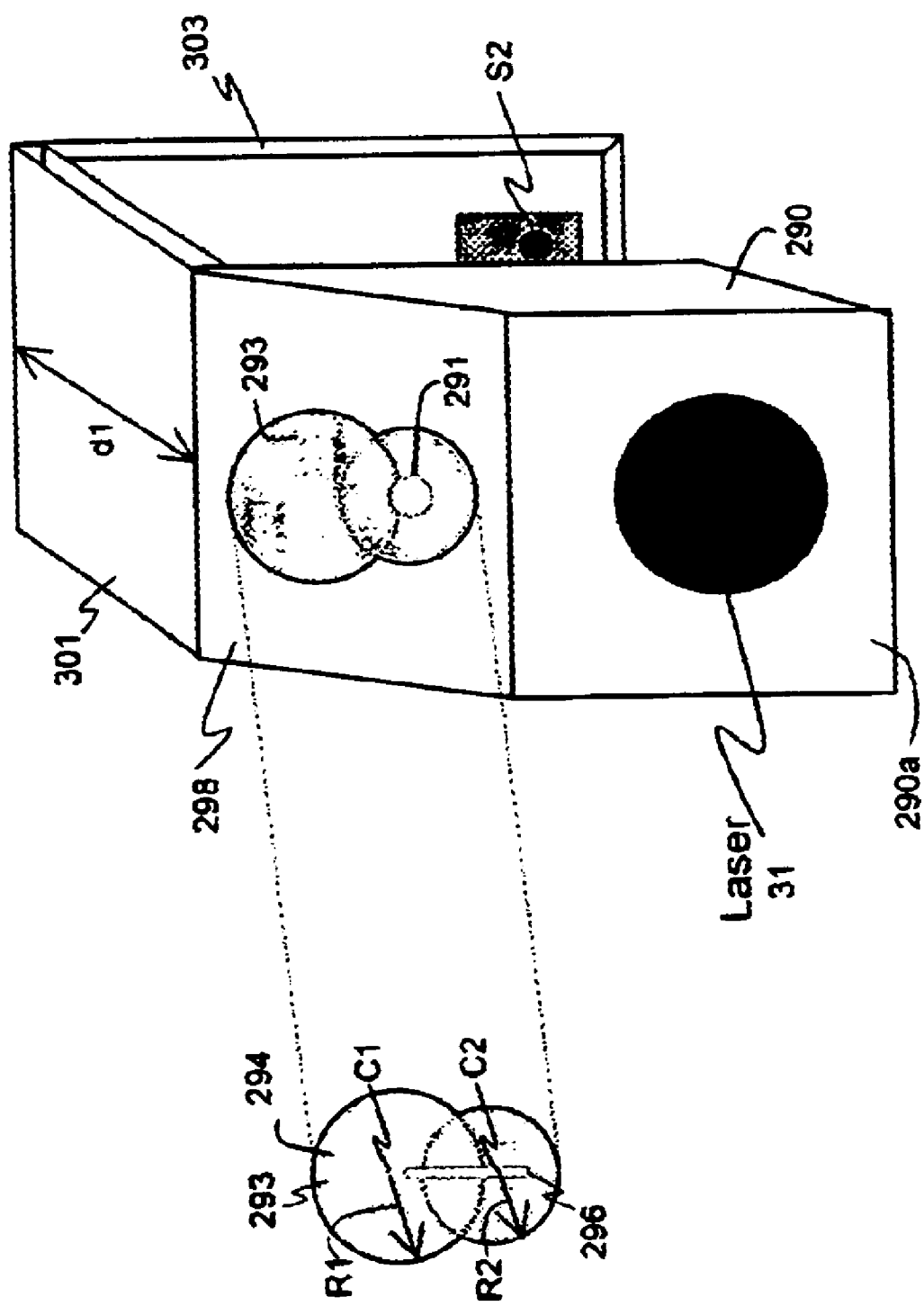
FIG. 6 is an isometric view of an assembly for mounting the laser light source and associated optical sensors and the aperture and slit assembly.
FIG. 6A is a top view of a recess and an aperture template for use with the mounting assembly of FIG. 6.

The formation of an aperture assembly for receiving light reflected from the hologram may be additionally described with reference to FIGS. 6, 6A, 7 and 8. A problem exists in the economic and easy manufacture of an aperture and slit assembly. It is difficult and/or unduly expensive to manufacture a rectangular shape. Accordingly, an aperture assembly embodying the invention includes two overlapping circles (see FIG. 6A). Circles are easy to form by a milling process. A first milling bit is used to form a first recessed circle (C1) with a radius R1 on a surface 298 of block 290 (see FIGS. 6 and 6A). A second milling bit is used to form a second recessed circle (C2) with a radius R2 in the same surface 298. The two circles overlap to produce a recessed distorted figure eight like shape 293 as shown in FIGS. 6 and 6A. A hole 291 which goes through the block material (see FIG. 3) can be formed at a selected point along a line running between the centers of the two circles. The hole 291 is formed with threaded walls so that only the light that comes into the wall parallel (or nearly so) to the walls of the hole, passes through the hole. Any light incident at an angle to the sides of the wall will be reflected back and hence will not pass through.

The threaded hole 291 solves the problem of having S1 sensing light impinging on hole 291 at an angle other than beta. It allows only light that comes in directly through the center of the hole to pass through the hole and impinge on the sensor S1. That is, the through-hole is threaded (tapped) to only allow light to pass through the hole that is projected from the illumination point through the central portion of the hole. Light reflected from the illumination point at an angle other than beta will not pass through the hole and onto the sensor S1.

Figure 8:
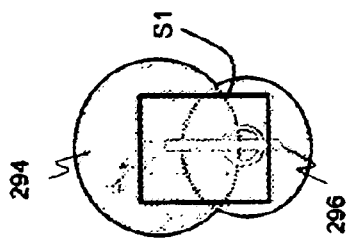
FIG. 8 is a top view showing the mounting of the optical sensor S1 within the aperture assembly of FIG. 6A.

Referring to FIG. 8, there is shown a template 294 for forming a slit 296 for the aperture for light sensor S1; where the template 294 may be formed using a thin sheet of material having a similar shape to the shape of the distorted figure eight shown in FIG. 6A. A slit 296 may be formed in the thin sheet of material along a line joining the centers of the two circles C1 and C2, and the thin template/slit assembly will fit uniquely within the figure eight recess 293 made in surface 298, as shown in FIG. 3. Thus, the hole slit (aperture) assembly has some distinctive features. It allows a high degree of reflected light to impinge on the sensor S1. It is also arranged for ease of assembly. FIG. 8 illustrates that the optical sensor S1 fits snuggly within the distorted FIG. 8 depression of 298. In fact, the outside dimensions of the optical sensor S1 package will normally control the size of radius R2 in circle C2. Advantages of this structure is that it is easy to machine the mounting block 290 to form the recessed figure-eight shape and it is also easy to drop the template/slit assembly 294 within the recess and to keep it in place.

FIG. 6 is an isometric (not to scale) drawing of the mechanical assembly for holding the laser light source 31, optical sensor S1 and optical sensor S2. The mechanical assembly may be described, generally, as an inverted U-shaped member. The lower left hand side of block 290 shown in FIG. 6 and denoted as 298 has a circular hole in which the laser light source is mounted. The block 290 includes an angled portion denoted as 290b in which there is milled out a shape which resembles a distorted figure eight (or upside down snowman) for mounting sensor S1. The distorted figure-eight recess 293 is formed by milling two overlapping circles (see C1 and C2 in FIG. 6A) with one circle (C1) having a radius R1 and the other circle (C2) having a radius R2. By making R2 smaller than R1, the distorted figure-eight is formed. FIGS. 6A and 8 illustrate the characteristics of a template 294 which is to be inserted within the distorted figure eight depression formed in face 298. As noted above, using overlapping circles to manufacture the depression (recess) to mount optical sensor S1 and the aperture assembly, makes the fabrication of the mounting and assembly easy and reliable and relatively precise. Extending horizontally from the top of block 290 is extension 301 (the top of the inverted U) of length d1. A board 303 (defining the other side of the inverted U) is attached to the far end of extension 301. Board 303 is used to mount optical sensor S2, as described above.

Figure 7:
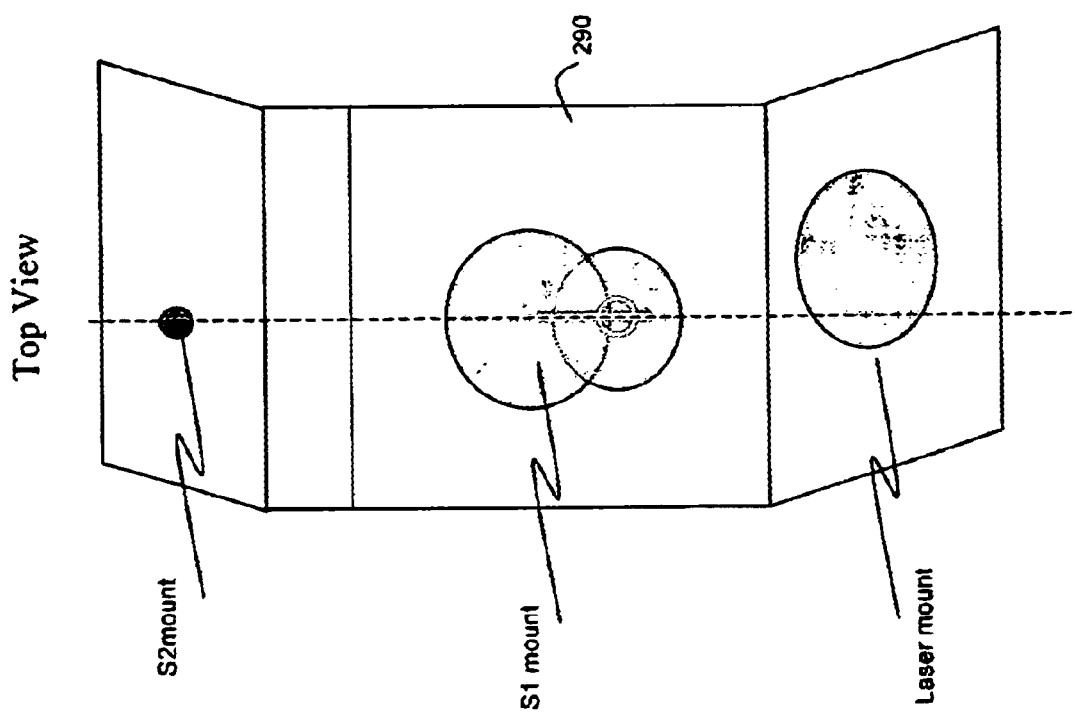
FIG. 7 is a folded-out view of the assembly of FIG. 6 showing the location of the elements along the same plane and line.

FIG. 7 is intended to illustrate that, when the inverted U-shaped mount is folded out and extended, the center for the hole to mount the light source, the center for hole 291, the center line for slit 296 and the center hole for optical sensor S2 lie in the same plane and along the same line.

Mounting the bar code reader 20 and the magnetic stripe reader/writer 30 in the same enclosure 3, and coupling the two units together to the same CPU 10 facilitates the performance of the following functions. The bar code reader 20 is positioned (see FIG. 2) to read bar code data (parallel black and white stripes) formed on a passing card. The magnetic stripe read/write scanner 30 is positioned to either read data from a passing card or to write data on a passing car, under the control of CPU 10. In one embodiment of the invention, the bar code reader 20 is located such that the bar code data will be read and decoded and fed to the CPU before magnetic data is read or written. However, it should be appreciated that other arrangements are possible (e.g., the magnetic data could be read first and then stored until the bar code data is read and decoded). Bar code data read from a passing card can be decoded and fed to the CPU 10 to prime the CPU 10 such that, when the CPU 10 receives signals from the magnetic scanner 30, it can modify or interpret the sensed "magnetic" data according to commands contained in the bar code data. Thus, the bar code data and the bar code reader can be used to control the reading of the magnetic stripe data and to correctly interpret the "magnetic" data. The bar code reader can also supply signals to the CPU 10 which can then supply signals to the scanner 30 to write (encode) a card passing through the information reader enclosure.

The cards to be read by the reader of the invention may contain a bar code and a magnetic stripe. The bar code may have a unique pattern for use with the particular hologram formed on the card. The data written on the magnetic stripe may be a function of data received from, and/or stored in, the host, the hologram information, the data read from the bar code, and various other encryption keys. The data written to the magnetic stripe may be encrypted in such a manner that only other like readers will have the ability to read the magnetic stripe information.

Thus, in a multi-sensor reader of the invention, each card that is read must pass the individual test of each sensor and then must pass the test from a selected combination of the sensors.

The invention has been illustrated for the case where the card is propelled along by a motorized carriage. It should be appreciated that the invention also applies to the case where the card is moved through the reader by hand swipe.

The reading of the top and bottom surfaces of a card has been used by way of example. It should be evident that a "card" is used by way of example and the reader of the invention may be used to read any suitable surface.

It should also be evident that the sensors used to illustrate the invention are by way of example. Thus, an information reader embodying the invention for sensing whether information on a surface to be read is valid may be formed within a unitary enclosure and includes a plurality of different sensors for sensing the presence of different types of information on the surface being read. Each sensor is programmed to sense whether certain criteria pertaining to that sensor are met. In addition, the outputs of selected sensors are compared to ascertain whether the outputs of the selected sensors have a preset relationship indicative of a valid condition.

Figure 9A:
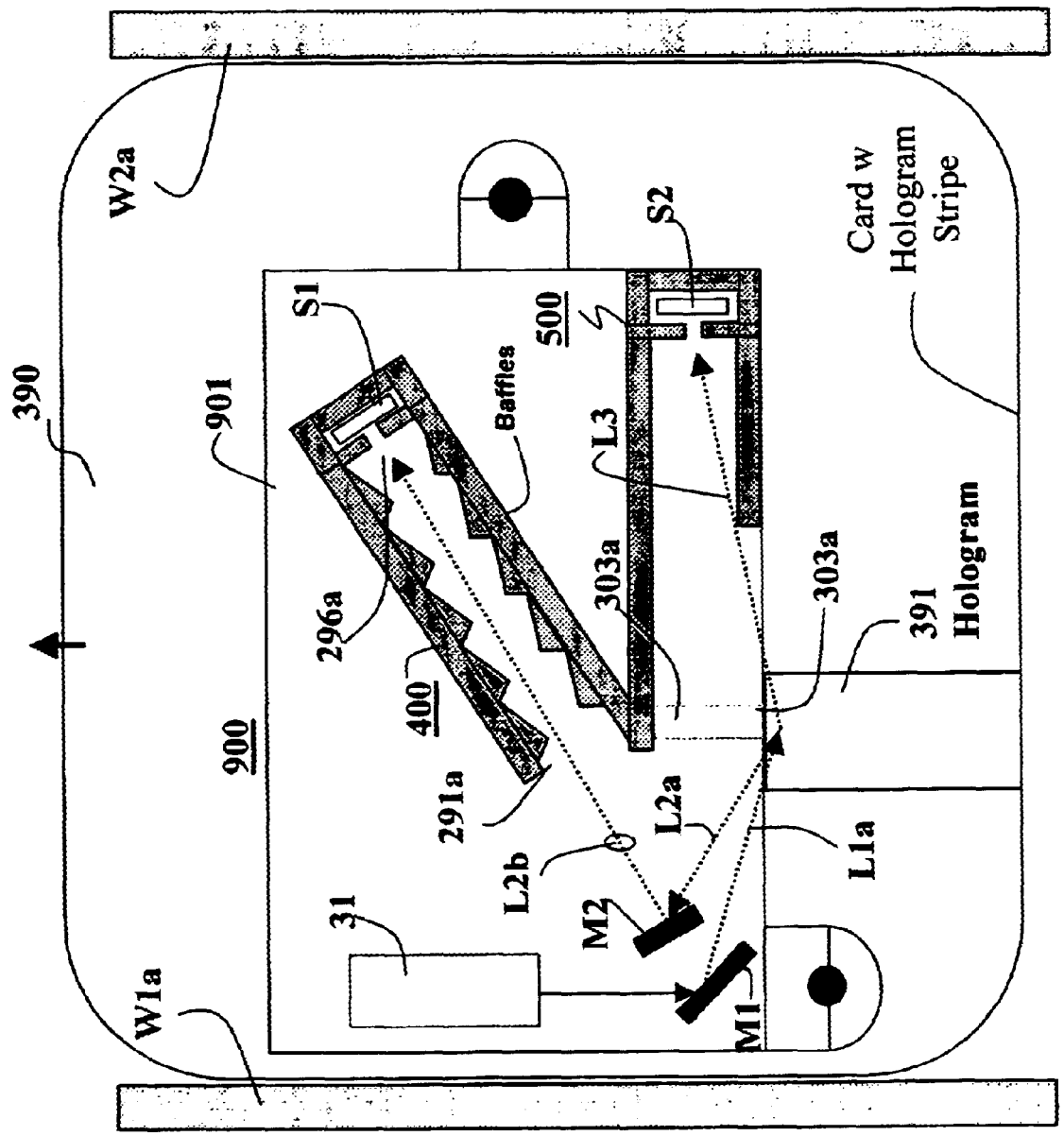
FIG. 9A is a cut away top view of a "slim" hologram detector and a surface characteristic sensor in accordance with the invention.
Figure 9B:
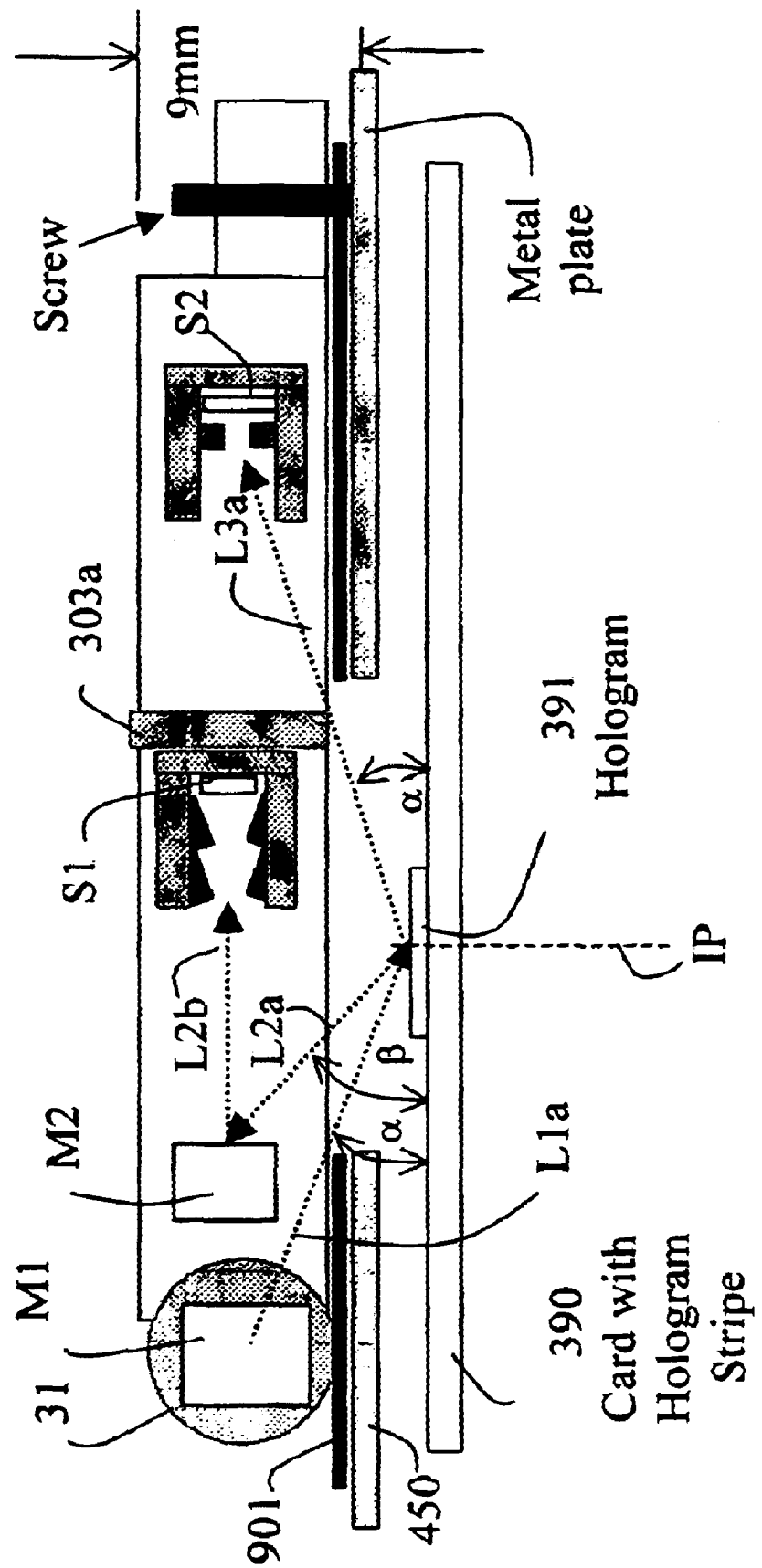
FIG. 9B is a highly simplified, not to scale, rendition of the side view of the "slim" hologram detector and surface sensor of FIG. 9A.
Figure 9C:
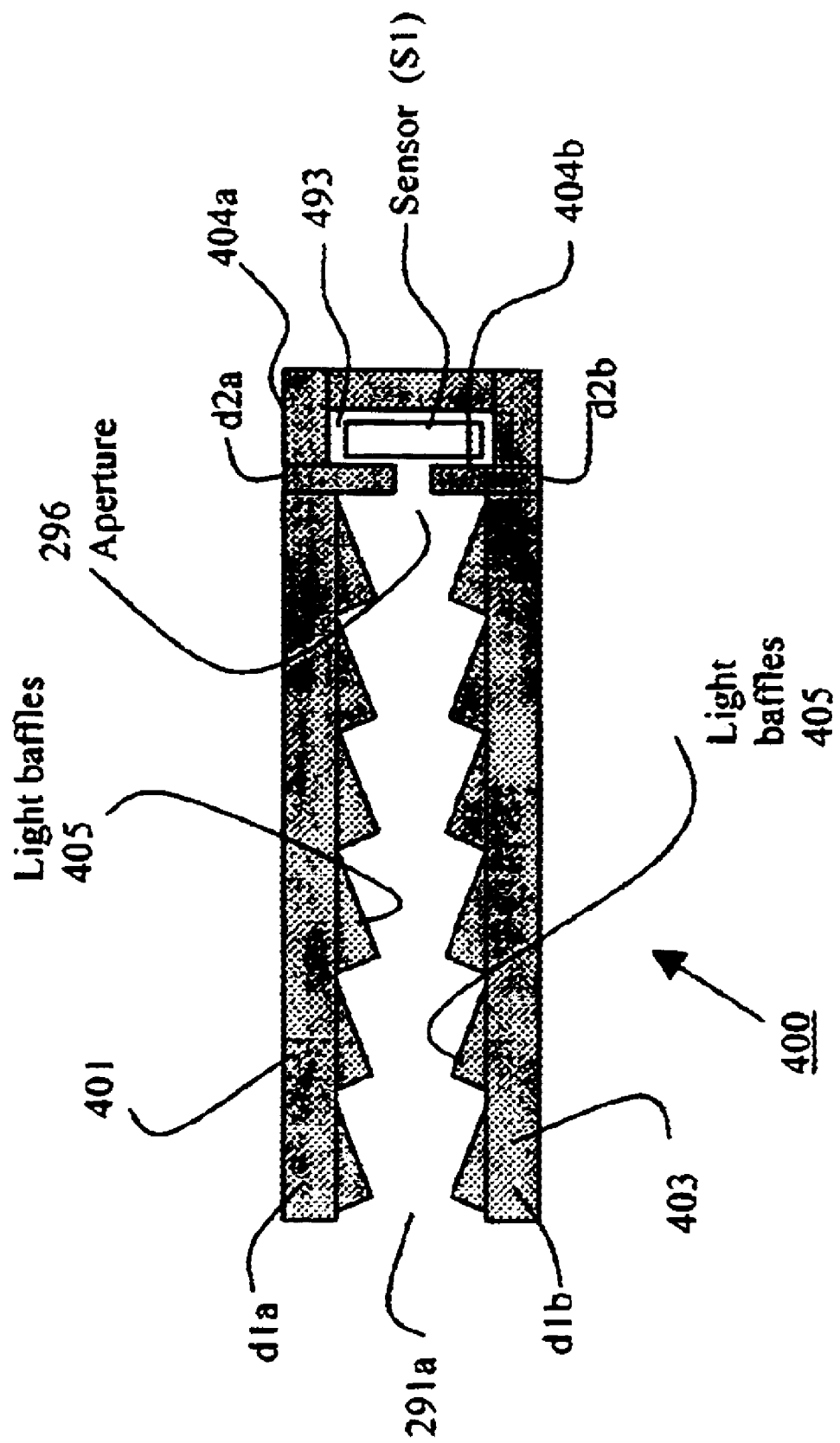
FIG. 9C is a top view of a light guide suitable for use in systems embodying the invention.

Referring to FIGS. 9A and 9B there is shown a top (cut away) view and a side view, respectively, of part of a "slim" reader assembly 900 which can perform the same or similar functions to the ones described in FIGS. 2 and 3, above. The components of reader assembly 900 are laid out differently than those shown in FIGS. 2 and 3 to meet the small headroom and space requirements of a particular reader. In FIGS. 9A and 9B the components of reader assembly 900 are mounted on a printed circuit board 901 which is mounted above the path of travel of a card 390. In this embodiment the height of the package containing the assembly 900 is limited to 9 millimeters with the package containing a light source 31, optics for projecting the light and reflecting received light, and sensors for sensing the reflected light. The reader assembly 900 is mounted on a metal plate 450, overlying a channel along which card 390, to be read, is passed. Plate 450 has suitable openings for allowing light to be projected on the card below and for light to be reflected from the card. A card 390 (where the card may be any document) with a hologram 391 formed thereon may be moved (as indicated by the directional arrow) between the two walls, W1a and W2a, of the reader, underneath the reader assembly. The reader assembly 900 for reading the "holographic" information includes laser light source 31, with a focusing lens, whose light output is projected onto a mirror M1 which then projects the light (L1a) at an acute angle α, relative to the horizontal, onto a hologram 391 formed on the card, as shown in FIG. 9B. A light signal L2a reflected (upwards) from the hologram at an acute angle β, relative to the horizontal, is reflected onto a mirror M2 which causes the reflected light to be directed as light beam L2b onto a sensor S1, which functions in a similar manner to sensor S1 of FIGS. 2 and 3. Sensor S1 is mounted and held within a recess 493 located at the rear of a light guide 400 which is shaped to ensure that only light reflected at an angle β from the card/hologram is sensed by sensor S1. A light guide 400 suitable for practicing the invention is detailed in FIGS. 9A and 9C. Referring to FIG. 9C note that light guide 400 includes outer walls 401, 403 extending from a first (front) end d1a, d1b to a second (rear) end d2a, d2b. At the point d2a, d2b a stop 404a, 404b is formed with an aperture (hole or slit) 296a centered within the stop region. Sensor, S1, which may be a silicon photodiode, is placed within a recess 493 with its sensing element facing the aperture 296 to sense the light reflected from the hologram into the opening 291a of the light guide and then coming through the aperture 296. Light baffles 405, which function as optical obstructing devices, are formed along the inner walls of the light guide 400 to block light coming at an angle other than β from passing through the light guide 400. That is, light hitting the inner side walls of light guide 400 is prevented by the baffles 405 from passing up the light path towards S1 and does not impinge on the sensor S1. Only light passing through the central opening of the light guide parallel to the inner walls can pass through the light guide and then through the aperture 296 onto the sensor. Although the structure of the light guide in FIGS. 9A, 9B and 9C is different from that of FIGS. 2 and 3, a similar function is performed regarding the sensing and processing of the light reflected from the hologram.

The figures show that incident light L1a produces an incident acute angle α relative to the horizontal. In response to L1a and in the presence of a signal (e.g., hologram 391) at the illumination point, IP, a signal light L2a is reflected at an acute angle β onto mirror M2 which then causes a light signal to be sensed by photosensor S1. In response to L1a and as a function of the reflectivity of the surface (e.g., card, hologram, object) present at the illumination point, a light beam L3a, representing scattered light L3a is reflected from IP at an obtuse angle (180-α) relative to the incoming horizontal plane. The scattered light (L3a) reflected from the card/hologram is projected onto a photosensor S2 via a light guide 500, which does not have baffles. In this embodiment the scattered reflected light is projected directly onto S2, and is prevented by a stop 303a from being reflected onto sensor S1. The signals derived from sensor S2 and the combination and comparison of the signals from S2 and S1 are similar to that described above for FIGS. 2 and 3.

What is claimed is:

1. An information reader for reading data contained on a card, where the data on the card may include at least one of bar code data, magnetic data and holographic data contained within a target area, comprising:

a housing containing a holograph sensing means and a surface detector;

said housing including means for inserting the card to be read within the housing;

said holographic sensing means including a laser beam for illuminating said card and a first sensor for sensing holographic information contained on the target area of said card;

said surface detector including a second sensor for sensing reflectivity characteristics of a surface of said card outside of said target area as well as within the target area; and means for comparing signals sensed by the first and second sensors from the target area and means for sensing the signals produced by the second sensor outside of the target area independently of the signals produced by the first sensor and including means for ascertaining that a signal corresponding to the reflectivity characteristic lies within a predetermined range.

2. The information reader as claimed in claim 1 further including a central processing unit (CPU) coupled to each one of said bar code reading means, said magnetic data reading means, said surface detector and said holographic sensing means for processing the data sensed by said bar code reading means, said magnetic data reading means, said holographic sensing means, and said surface detector.

3. The information reader as claimed in claim 2 wherein said CPU processes the bar code data, the magnetic data and the holographic data contained on said card and the data sensed by said surface detector to ascertain the validity of the card, where ascertaining validity includes determining whether the signal derived from the holographic sensing means has a predetermined time-phase relationship to the signal derived from the surface detector.

4. The information reader as claimed in claim 3 wherein when the card first enters the reader and the laser first illuminates the front edge of the card whose contents are to be read, the first sensor and the surface detector measure the reflected optical energy, with the first sensor and the surface detector measuring different aspects of the reflected energy.

5. The information reader as claimed in claim 4 wherein the signal derived from the first sensor is not coherent relative to the signal derived from the surface detector to establish the validity of the card being read.

6. The information reader as claimed in claim 1, wherein said housing further includes a shield for preventing scattered light reflected from said card from impinging on the first sensor while enabling scattered light to be sensed by said surface detector for sensing certain characteristics of the card surface.

7. The information reader as claimed in claim 6 further including a central processing unit (CPU) coupled to each one of said bar code reading means, said magnetic data reading means, said holographic sensing means and said surface detector for processing the data sensed by said bar code reading means, said magnetic data reading means, said holographic sensing means and said surface detector for ascertaining the validity of the card.

8. The information reader as claimed in claim 1, further including shielding for preventing scattered light reflected from said card from being reflected back and from being sensed by the holographic sensing means while enabling the scattered light to be sensed by the surface detector.

9. The information reader as claimed in claim 1, wherein said means for ascertaining that a signal corresponding to the reflectivity characteristic lies within a predetermined range includes means for coupling the surface detector to first and second comparators, the first comparator for ascertaining that the output of the surface detector is below a first level and the second comparator for ascertaining the output of the surface detector is above a second level.

10. An information reader for reading data contained on an object, where the data on the object includes at least one of bar code data, magnetic data and holographic data, comprising:

a housing containing a laser light source and said housing including means for inserting said object within the housing;

means within said housing for projecting a laser beam from said laser light source at a first acute angle onto a surface of said object;

a first sensor located within said housing for sensing light reflected from an illumination point on said surface of said object at a second acute angle, related to the first acute angle, for detecting the presence of a hologram on said surface;

a second sensor located within said housing for sensing scattered light reflected from said surface of said object at an obtuse angle and for sensing the reflectivity of a surface of said object in the presence or absence of a hologram; and data processing means located in said housing coupled to said first and second sensors for processing the sensors outputs and ascertaining the validity of the information being read by determining: a) whether there is coherence between the signal derived from the first sensor and the signal derived from the second sensor; and b) whether the signal produced by the second sensor lies within a given range.

11. The information reader as claimed in claim 10, wherein said first sensor and said means for projecting a laser beam are disposed so that the laser beam is incident on the surface of said object at a first angle with respect to a reference plane and the light reflected from said surface onto said first sensor is reflected at a second angle relative to said reference plane.

12. The information reader as claimed in claim 10, further including a light shield for blocking scattered light from impinging onto said first sensor while enabling the second sensor to sense the scattered light.

13. A multi-sensor reader for reading coded information located on a surface of an object comprising:

a housing including means for receiving the object;

a light source located within the housing for projecting light onto the surface of said object at a first acute angle;

a first optical sensor located within the housing for sensing light reflected back towards the light source from the object's surface at a second acute angle for sensing coded information;

a second optical sensor located within the housing for sensing light reflected at an obtuse angle away from the light source for sensing reflectivity characteristics of the surface of the object; and a light shield, located within the housing, for blocking any of the light reflected at an obtuse angle from impinging on the first sensor.

14. A multi sensor reader comprising:

an enclosure;

a laser light source within said enclosure;

means within said enclosure for projecting the light source at a first acute angle and focusing said light source at a first point on a plane within said enclosure;

first optical means within said enclosure for sensing light reflected back from said first point at a second acute angle; where the second acute angle is equal to "n" times the first acute angle; where "n" is a number greater than one;

second optical means within said enclosure for sensing light scattered from said first point; and shield means within said enclosure for blocking light scattered from said first point from impinging onto said first optical means.

15. The multi sensor reader as claimed in claim 14 wherein the outputs of the first and second optical means are compared to ascertain any phasal coincidence between the signals received from said first and second optical means.

16. A multi sensor reader comprising:

first and second walls on either side of a track along which an object containing data to be read is made to pass;

means for mounting a laser light source along the first wall including means for projecting the laser light beam at a first angle onto a first point along the track;

means for mounting a first sensor along the first wall for sensing light reflected from said first point at a second angle;

means on said second wall for receiving light reflected from said first point and for scattering said received reflected light back towards said first wall;

means including a second sensor located between said first and second walls for sensing the scattered light reflected from said second wall and for blocking any of the scattered light from passing back to said first wall.

17. The multi sensor reader as claimed in claim 16, wherein the signals sensed by said first sensor are compared to the signals sensed by said second sensor.

18. An information reader for reading data contained on a card to be inserted within said reader comprising:

a bar code reading means for sensing bar code data contained on the card; a holographic sensing means for sensing any hologram present on said card, a surface detector for sensing certain reflectivity characteristics of a surface of the card and a magnetic data reading/writing means for sensing magnetic data contained on said card, said bar code reading means, said holographic sensing means and said magnetic data reading/writing means and said surface detector being contained within the same enclosure; and wherein said surface detector produces a continuous signal voltage corresponding to the reflectivity of a surface of the card as the card enters and passes through the reader, independently of said holograph sensing means.

19. The information reader as claimed in claim 18 further including a central processing unit (CPU) coupled to said bar code reading means, to said holographic sensing means, to said surface detector and to said magnetic data reading/writing means for sensing the data read by said bar code reading means, the hologram sensed by said holographic sensing means, the surface condition sensed by the surface detector and said magnetic data reading/writing means, and for processing the data read from the magnetic data reading/writing means in response to the data read by said bar code reading means.

20. The information reader as claimed in claim 19, wherein said bar code reading means is physically located, within the information reader enclosure, before the magnetic data reading/writing means to enable a card passing through the enclosure to be read by the bar code reader prior to being operated upon by the magnetic data reading/writing means and for the information which is read by the bar code reader to be decoded and sent to the CPU before the card passes by the magnetic data reading/writing means.

21. The information reader as claimed in claim 20, wherein the bar code data sent to the CPU is used to modify information on the card.

22. The information reader as claimed in claim 18, wherein the signal produced by said surface detector is supplied to a first comparator to sense whether at any time the signal exceeds a first value (V1) and to a second comparator to sense whether at any time the signal decreases below a second value (V2).

23. The information reader as claimed in claim 22 wherein signals produced in the holographic sensing means are coupled via a first analog-to-digital converter (ADC) to a central processing unit (CPU) and wherein signals produced by the surface detector are coupled via a second ADC to said CPU, for comparing the signals produced by the holographic sensing means with those produced by the surface detector; and wherein the outputs of the first and second comparators are also supplied to said CPU.

24. A combination comprising:

means for projecting a beam of light onto a point;

means for passing an object by the point whereby a section of a surface of the object is passed entirely by the point;

an optical detector for sensing light reflected from said surface to ascertain the reflectivity characteristics of the surface of the object as the object passes by the point and for converting the received light into a continuous signal voltage; and means for applying the continuous signal voltage to a comparator for ascertaining whether the signal voltage of the received light is within a predetermined range, where the predetermined range is derived from a memory storage means storing information regarding the permitted range of reflectivity of the object being illuminated.

25. The surface reflectivity detector as claimed in claim 24 wherein the output of the comparator is supplied to a central processor unit for producing a signal indicating whether the received light is within the predetermined range for the entire length of the object.

26. A multi-sensor reader for reading coded information contained on the surface of an object comprising:

a light source and light projecting means for projecting the light source onto a surface of the object at a first acute angle relative to a horizontal plane;

a first optical sensor for sensing light reflected back from the surface of the object at a second acute angle, relative to the horizontal plane, for sensing the presence of coded information on the surface of the object, where the second acute angle is equal to "n" times the first angle and "n" is a number greater than one;

a second optical sensor for sensing light reflected at an obtuse angle away from the light source and for converting the received light into a continuous signal voltage, where the obtuse angle is equal to 180 degrees minus the value of the first angle;

means for applying the continuous signal voltage to a comparator for ascertaining whether the voltage level lies within a predetermined range; and data processing means coupled to said first and second optical sensors for processing the signals produced by these sensors and for ascertaining any phasal relationship between them.

27. The multi-sensor reader as claimed in claim 26 further including an inverted U-shaped member; and wherein the light source and the first optical sensor are mounted on one of the vertical sides of the inverted U-shaped member; and wherein the second optical sensor is mounted on the other vertical side of the inverted U-shaped member, where the other vertical side functions to block undesired light from impinging on the first optical sensor.

28. The multi-sensor reader as claimed in claim 27 wherein the first and second optical sensors are arranged to lie in the same plane.

29. A multi-sensor system for sensing information contained on the surface of an object comprising:

a housing including means for enabling an object to be inserted within the housing;

means located within the housing for projecting and focusing a stationary laser light source at a point on a surface of an object inserted within the housing;

means for causing an object containing information to be sensed to pass the point;

optical sensing means for sensing the laser light reflected from the object, said optical sensing means being responsive to information signals contained within light reflected from the object; and shield means within the housing for preventing scattered light from being reflected back to the optical sensing means.

30. An information reader, formed within a unitary enclosure for determining whether the information on a surface of an object inserted within said information reader is valid, comprising:

a bar code reader device;

a magnetic stripe reader/writer device;

a hologram sensing device for sensing holographic information reflected from the surface of the object; a laser light beam for projecting light at an acute angle on the surface of the object; a surface detector device for sensing scattered light reflected, from the surface of an object, at an obtuse angle; said devices for sensing the presence of different types of information on the surface being read and producing corresponding outputs;

a light shield within the enclosure for enabling the scattered light to be sensed by the surface detector device while blocking the scattered light from impinging on the hologram sensing device; and means for comparing the outputs of selected ones of said devices for determining whether a phasal relationship exists in the information read by the selected devices.

31. The information reader as claimed in claim 30 wherein said means for comparing the outputs of selected ones of said plurality of devices includes a central processing unit (CPU) coupled to said devices; and wherein the surface detector is for sensing reflectivity characteristics of the surface of the object being read.

32. The information reader as claimed in claim 31 wherein said information reader includes an object movement controller and an object position sensor.

33. The information reader as claimed in claim 31 wherein said information reader includes a shielding element for preventing scattered light from affecting the hologram sensing device.

34. An information reader for reading data contained on a card, where the data may include holographic data contained within a target area comprising:

a housing containing a holograph sensing means and a surface detector; and means for inserting a card to be read within the housing;

said holographic sensing means including a laser light source and means for generating a laser beam and projecting the laser beam onto an illumination point along a surface at a first acute angle (alpha) relative to the plane of the surface; said holographic sensing means also including means for sensing light reflected from the illumination point at a second angle (beta) relative to the plane of the surface, where the second angle is equal to "n" times the first angle and "n" is a number greater than one;

said surface detector for sensing the reflectivity characteristics of a surface of said card outside of said target area as well as within the target area; and wherein said surface detector includes means for sensing light scattered from the illumination point along a third angle which is equal to 180 degrees minus alpha.

35. A system for sensing information contained on the surface of an object comprising:

a housing including means for enabling the object to be inserted within the housing and to pass through the housing;

means located within the housing for projecting a light source at a point on a surface of the object inserted within the housing;

optical sensing means for sensing light reflected from the object including a light guide having parallel side walls extending from a front end to a rear end, with a first light sensor located at the rear end; and the light guide positioned to receive light reflected from the object at its front end; and the inner walls of the light guide including means for preventing light, reflected from the point, tending to hit the inner walls of the light guide from passing along the light guide and impinging on the first light sensor.

36. The system as claimed in claim 35 wherein the first light sensor is positioned in the rear end of the light guide facing an aperture stop also located at the rear end of the light guide whereby light reflected from the object passing through the center of the light guide, parallel to the side walls, can impinge on the first light sensor.

37. The system as claimed in claim 35 wherein the means for preventing light reflected from the point from passing along the light guide includes an arrangement of baffles.

38. The system as claimed in claim 35 wherein the means for preventing light reflected from the point from passing along the light guide includes a threaded cylindrical opening.

39. The system as claimed in claim 35 wherein light scattered from the point is reflected onto a second light sensor for sensing the scattered light.

40. The system as claimed in claim 39 further including shield means within the housing for preventing scattered light from being reflected back to the first light sensor.

41. The system as claimed in claim 35 wherein the light source is a laser light source and wherein the means for projecting the light source includes means for focusing the laser light source on the surface of the object.

42. The system as claimed in claim 41 wherein the information to be sensed, contained on the surface of the object, is a hologram.

43. The system as claimed in claim 41 wherein the means for projecting the light source includes means for projecting a beam of light at a first acute angle ($\alpha$) onto the surface of the object for causing light to be reflected at a second angle ($\beta$) and wherein only light reflected at the second angle passes through the light guide and the aperture onto the first light sensor.

44. A data reader comprising:

an enclosure;

a laser light source within said enclosure;

means within said enclosure for projecting the light source at a first acute angle and focusing said light source at a first point on a plane within said enclosure;

first optical means within said enclosure for sensing light reflected back from said first point at a second acute angle; where the second acute angle is equal to "n" times the first acute angle; where "n" is a number greater than one; said first optical means having an internal hollow path surrounded by side walls for passing light reflected from the first point via the internal hollow path onto a light sensor, the side walls of the internal hollow path including means for preventing light reflected from the walls of the path from propagating along the internal hollow path towards the light sensor.

45. The data reader as claimed in claim 44, further including a second optical means within said enclosure for sensing light scattered from said first point; and shield means within said enclosure for blocking the scattered light from impinging onto said first optical means.

46. The data reader as claimed in claim 44 wherein the internal hollow path includes a region extending from a front end proximal to the first point and a rear end distal from the first point, the rear end including an aperture and a light sensor for sensing the reflected light passing through the aperture; and the inner walls along the hollow path including optical baffles for preventing light reflected from the first point and hitting the baffles from passing through the hollow region and impinging onto the light sensor.

47. The data reader as claimed in claim 44 wherein the internal hollow path includes a threaded tubular region having a front end which is positioned closer to the first point and having a rear end positioned further away from the first point, the rear end including an aperture for passing light reflected from the first point along the path and through the aperture onto a light sensor facing the aperture, for sensing the light reflected from the first point surface and passing through the path and the threaded portion of the tubular region for preventing light impinging on the walls of the tubular region from propagating through to the light sensor.

* * * * *